United States Patent [19]
Sato et al.

[11] Patent Number: 5,518,274
[45] Date of Patent: May 21, 1996

[54] INDEX CARD

[75] Inventors: Makoto Sato, Kanagawa; Satoshi Aramaki, Tokyo, both of Japan

[73] Assignee: Fuji Photo Film Co., Ltd., Kanagawa, Japan

[21] Appl. No.: 380,573

[22] Filed: Jan. 30, 1995

[30] Foreign Application Priority Data

Apr. 4, 1994 [JP] Japan .................... 6-087205

[51] Int. Cl.[6] .................................................. B42D 15/00
[52] U.S. Cl. .................. 283/62; 283/61; 283/56; 281/2; 281/5; 206/387.1
[58] Field of Search ................... 281/2, 5; 283/56, 283/61, 62; 206/313, 387.1, 387.13

[56] References Cited

U.S. PATENT DOCUMENTS

| | | | |
|---|---|---|---|
| 2,631,046 | 3/1953 | Stephens | 283/56 |
| 3,858,792 | 1/1975 | Volkent | 283/56 X |
| 4,905,831 | 3/1990 | Bagdis et al. | 206/313 X |
| 5,308,118 | 5/1994 | Ovadie | 283/56 |

*Primary Examiner*—Willmon Fridie, Jr.
*Attorney, Agent, or Firm*—Sughrue, Mion, Zinn Macpeak & Seas

[57] ABSTRACT

A index card 20 is provided so that a third narrow part 25, a first narrow part 21 and a first wide part 22 overlap a second wide part 23, a second narrow part 24 and a third narrow part 26 respectively when folding is conducted with a border line between the first wide part 22 and the second wide part 23 a folding line 27. By this means, when conducting printing on the first narrow part 21 and the first wide part 22 using a printer of a word processor or PC, the parts from the second wide part 23 to the fourth narrow part 26 can be supported in a paper holding mechanism and a paper feed mechanism of the printer, and printing can be conducted over the entire paper surface.

8 Claims, 4 Drawing Sheets

5,518,274

INDEX CARD

BACKGROUND OF THE INVENTION

The present invention relates to an index card which is arranged along the inner walls of a case that houses a magnetic recording medium such as an audio tape cassette, a video tape cassette or a floppy disk cassette, and on which the contents of the magnetic recording medium are recorded. More particularly, it relates to an index card which has been improved so that printing can be conducted over its entire surface when printing is conducted with use of a printer of a word processor or personal computer.

Heretofore, magnetic recording mediums have been used such as audio tape cassettes and video tape cassettes which store sounds or images on magnetic tape, or magnetic disk cartridges which record computer or word processor data on discoid magnetic disks. Ordinarily, a magnetic recording medium is stored in a storage case, and preserved so that there are no adhesions of dust to the magnetic tape or magnetic disk.

Oftentimes, the storage case is molded from transparent or semi-transparent resin material so that the recorded contents of the magnetic recording medium which are described on an index card arranged along the inner wall can be read from the outside of the storage case as necessary.

To provide an example and explain this type of index card, a storage case 1 (shown by the imaginary line) shown in FIG. 7 is a transparent or semi-transparent one which houses, for example, a 3.5 inch magnetic disk cartridge. As is common knowledge, a cover part of one side, which has a pocket for insertion of the cartridge, and a casing part (case body) of the other side are configured to freely open and close via pivots 15. An index card 5 is provided inside the cover part; this index card 5 is formed by folding into a U-shape a paper which has a rectangular shape when unfolded.

The index card 5 comprises three parts: a first narrow part 6 which extends along a first wall 2 of the storage case 1 extending depthwise; a wide part 7 which extends along a second inner wall 3 of the storage case 1 extending widthwise and perpendicularly to the first wall 2 and which is provided so as to be connected to the narrow part 6; and a second narrow part 8 which extends along a third inner wall 4 of the storage case 1 extending in parallel opposite to the second inner wall 3 and which is provided so as to be connected to the first narrow part 6. It is formed by folding it into a U-shape using border lines between the respective parts as the folding lines.

On the other hand, the storage case 9 shown in FIG. 8 is a transparent or semi-transparent book type which allows insertion of, for example, a video cassette from the direction of arrow X. An index card 12, which is a paper having a rectangular shape when unfolded, is mounted inside the case in a state where the index card is folded into an L-shape.

The index card 12 comprises two parts: a first narrow part 13 which extends along a first wall 10 of the storage case 9 extending depthwise in the storage case 9; and a wide part 14 which extends along a second inner wall 11 of the storage case 9 extending widthwise in the storage case 9 perpendicular to the first wall 10 and which is provided so as to be connected to the narrow part 136. The index card is formed in a manner so that it is folded into an L-shape using the border line between the two parts as a folding line.

On the other hand, for purposes of entering a description of the recorded contents of the magnetic recording medium on each of the aforementioned index cards, the commonly used conventional methods are to write directly by hand using a writing implement such as a pen, or to describe using instant lettering which is transferred by rubbing the letters provided on a seal.

Yet, accompanying the general dissemination to ordinary households of word processors and personal computers (hereinafter referred to as "PCs") in recent years, the present state of affairs is that there are increasing numbers of users who seek to print the song names and contents recorded on the audio tape cassettes and VTR cassettes more neatly and voluminously onto the index cards with use of word processors or PCs.

Due to the limitations of their paper holding mechanisms and paper feed mechanisms, however, word processors and PCs are not able to print within a range of approximately 15 millimeters from the lower end of the paper to be printed on.

Accordingly, as shown in FIG. 9, when it is attempted to conduct printing with use of a printer of a word processor or PC from the first narrow part 6 to the wide part 7 of the unfolded index card 5, it is impossible to conduct printing on the hatched part shown at the lower end of the wide part 7 so that a blank space 16 is formed.

As a result, not only there is inconvenience that the amount of information which can be printed on the conventional index card 5 using a printer of a word processor or PC is limited, but also there is also a problem that a blank space is created which impairs the aesthetic appearance.

Furthermore, when it is desired to conduct printing on the back of the index card 5, the convenience of use is poor since it is necessary to momentarily remove the index card 5 from the printer, and then it is necessary to set the card 5 again in the printer so that the rear side becomes the front.

Thus, an index card has been used wherein the wide part of the index card is extended, and this extension can be detached by perforations, for example.

Yet, with regard to this type of index card, although it is possible to conduct printing down to the lower end of the wide part proper of the index card with use of a printer, since it is impossible to conduct ultimate printing down to the lower end of the extension, there is a problem that it is necessary to detach and discard the extension, and it is impossible to effectively use all the paper.

Furthermore, since it is necessary to provide perforations in the index card, there is a problem that the manufacturing cost of the index card increases.

In addition, even with this improved index card, it is impossible to conduct continuous and efficient printing from the front side to the back side.

SUMMARY OF THE INVENTION

The present invention was made in light of the above problem points. An object of the present invention is to provide an index card with superior convenience of use which allows printing over the entire surface of the narrow part and the wide part with use of a printer of a word processor or PC.

The aforementioned object of the present invention can be attained by an index card which is to be mounted in a folded state inside a case for housing a magnetic recording medium and which has a rectangular form when unfolded, characterized by comprising: a first narrow part which extends along a first inner wall of the case extending depthwise; a first wide part which extends along a second inner wall of the case perpendicular to the first wall and which is provided so as to be connected to the first narrow part; a second wide part provided so as to be connected to an end of the first wide part at a side thereof opposite the first narrow part; and a second narrow part provided so as to be connected to an end of the second wide part at a side thereof opposite the first wide part; wherein when folding is conducted with a border line between the first wide part and the second wide part as a folding line, the second wide part overlaps the first wide part, and the second narrow part overlaps the first narrow part.

The object can also be attained by a configuration in which a third narrow part, which extends along a third wall of the case extending in parallel opposite to the second inner wall, is provided so as to be connected to an end of the first narrow part at a side thereof opposite the first wide part, and a fourth narrow part is provided so as to be connected to an end of the second narrow part at a side thereof opposite the second wide part, and in that the third narrow part overlaps the fourth narrow part when folding is conducted along the folding line.

Moreover, the object can also be attained by a configuration wherein perforations are provided on the folding line, and further by a configuration wherein a folding part capable of clamping is provided so as to be connected to the end of one of the sides which is parallel to the folding line, and wraps around the end of the other side when folding is conducted.

The magnetic recording medium mentioned herein refers to a magnetic tape cassette which records images and/or sounds, such as an audio cassette or a VTR cassette, or to a magnetic disk cartridge which preserves the data of a computer or word processor.

DESCRIPTION OF THE PREFERRED EMBODIMENTS

Embodiments of the index card for a magnetic recording medium storage case of the present invention are explained below in detail based on the appended drawings.

Figure 1:
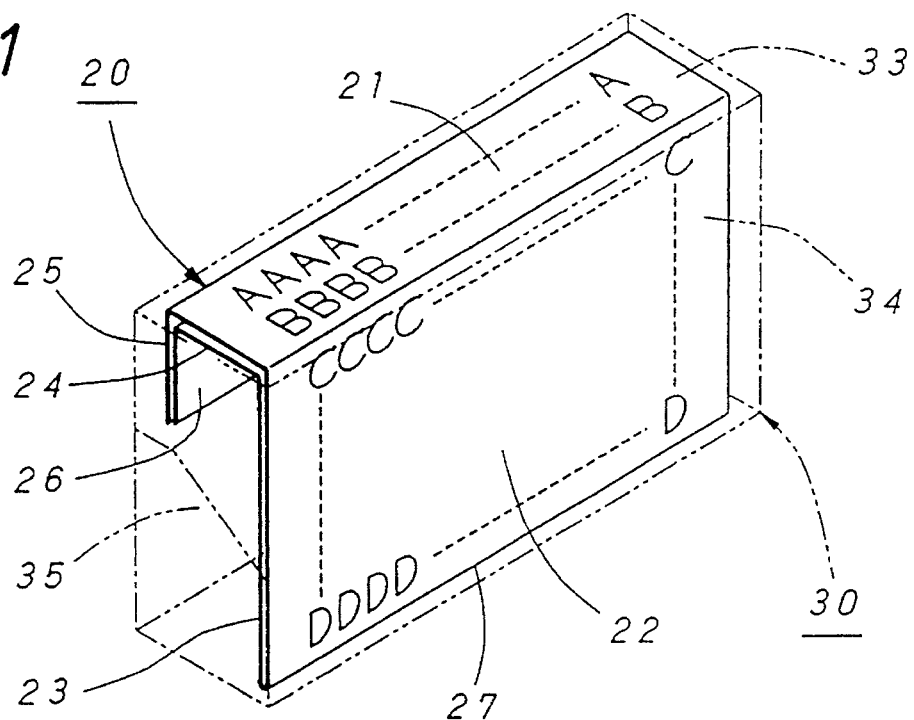
FIG. 1 is an overall perspective view of the index card according to a first embodiment of the present invention.
Figure 2:
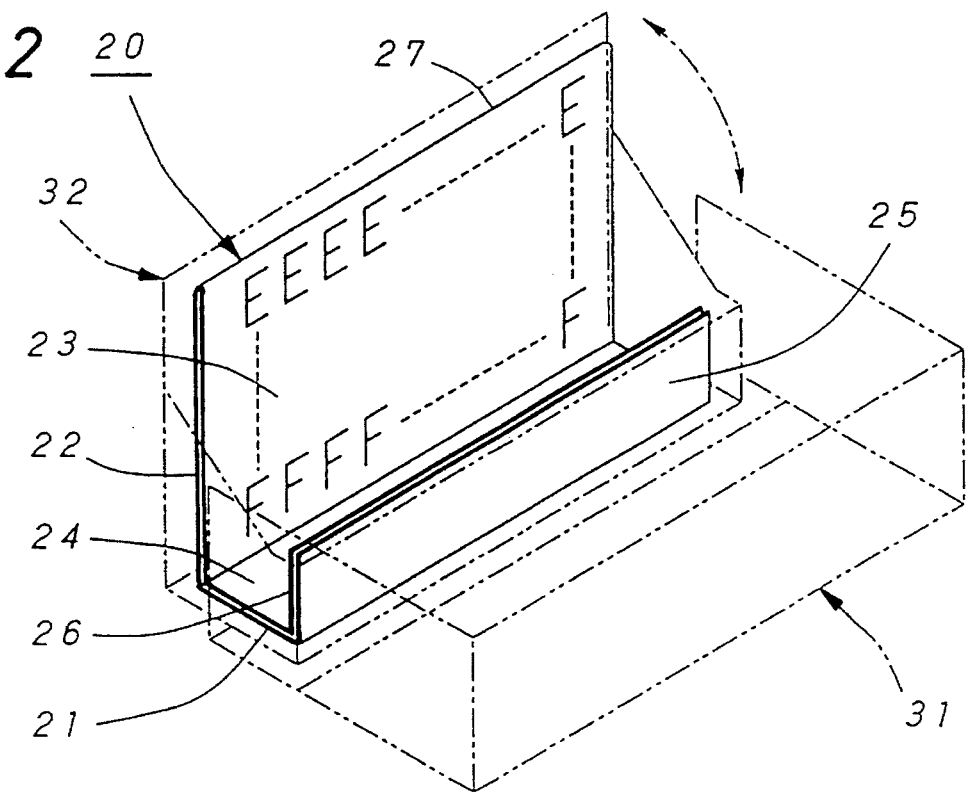
FIG. 2 is am overall perspective view of the rear side of the index card shown in FIG. 1.
Figure 3:
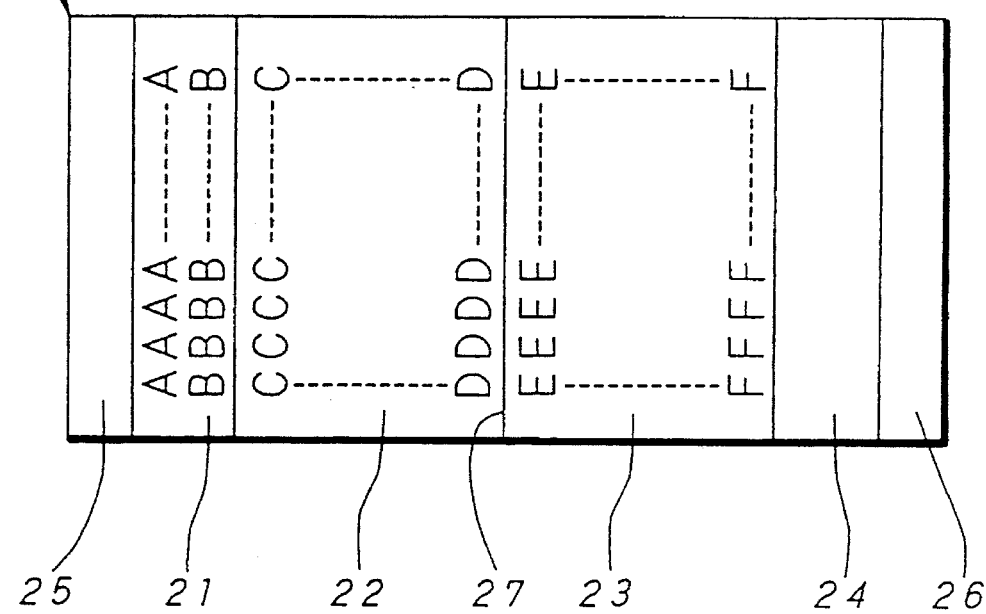
FIG. 3 is a development showing the printed state of the index card shown in FIG. 1.
Figure 4:
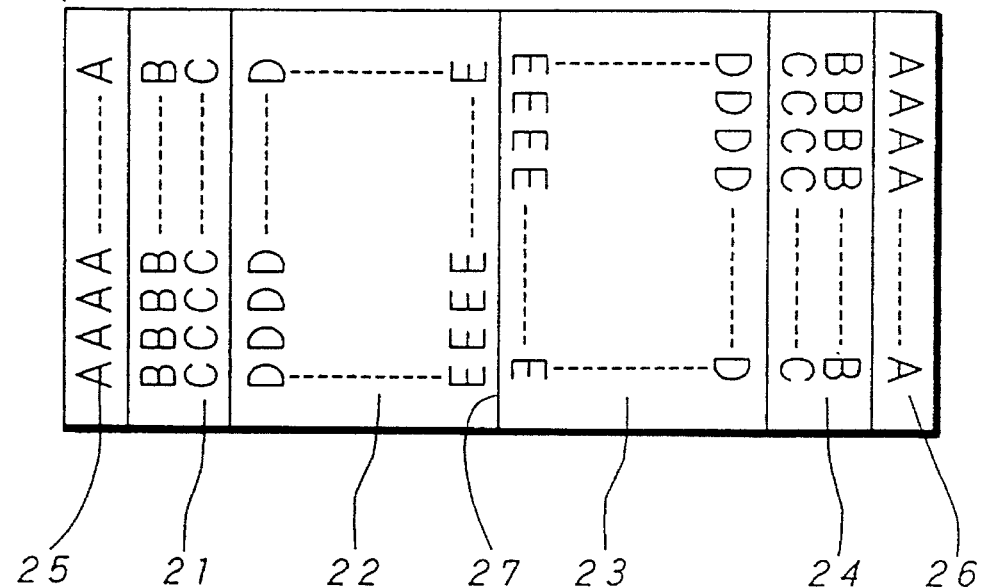
FIG. 4 is another development showing the printed state of the index card shown in FIG. 1.
Figure 5:
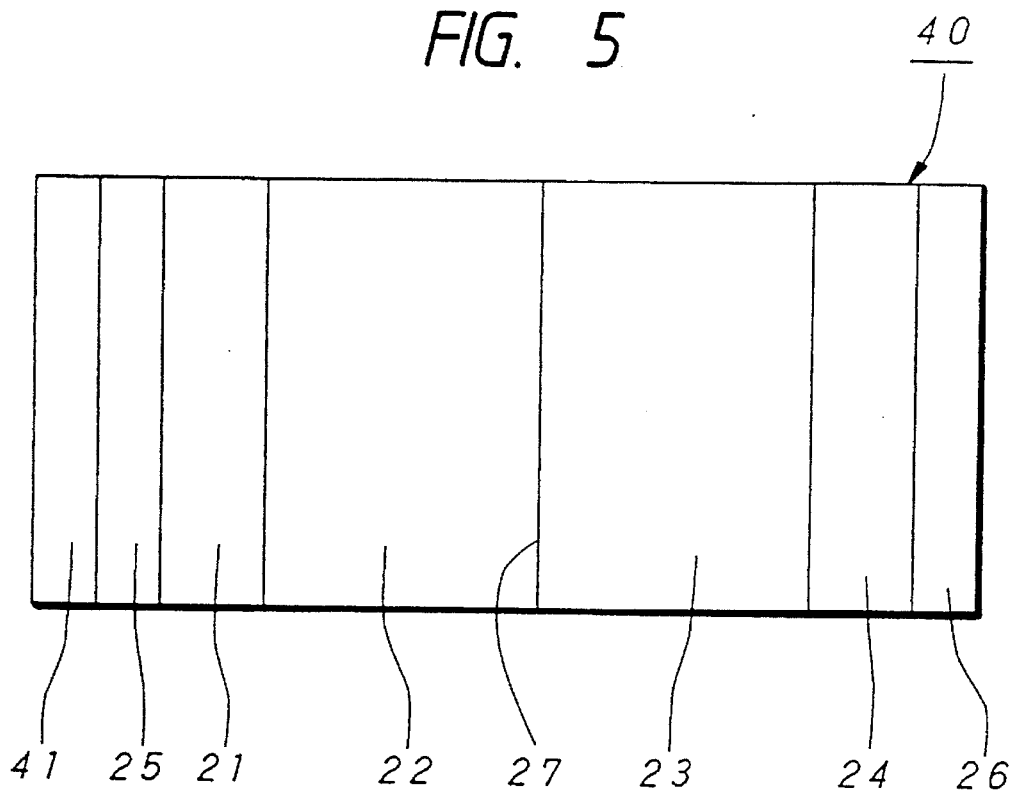
FIG. 5 is a development of the index card of the second embodiment of the present invention.
Figure 6:
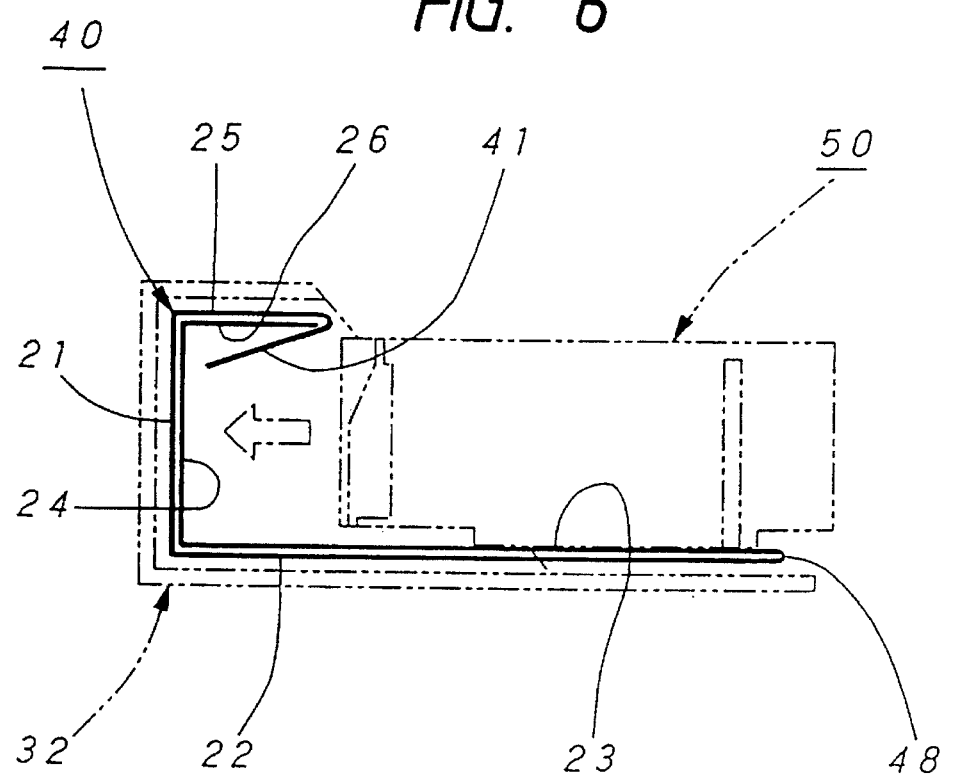
FIG. 6 is a side view showing the state where the index card shown in FIG. 5 is arranged inside a storage case.
Figure 7:
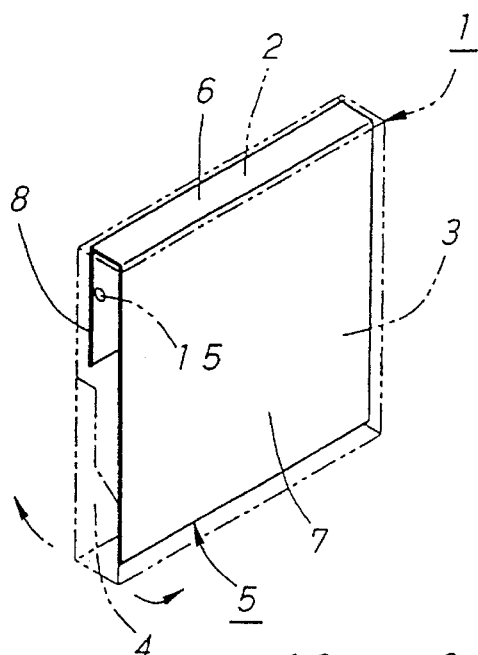
FIG. 7 is an overall perspective view of the conventional U-shaped index card.
Figure 8:
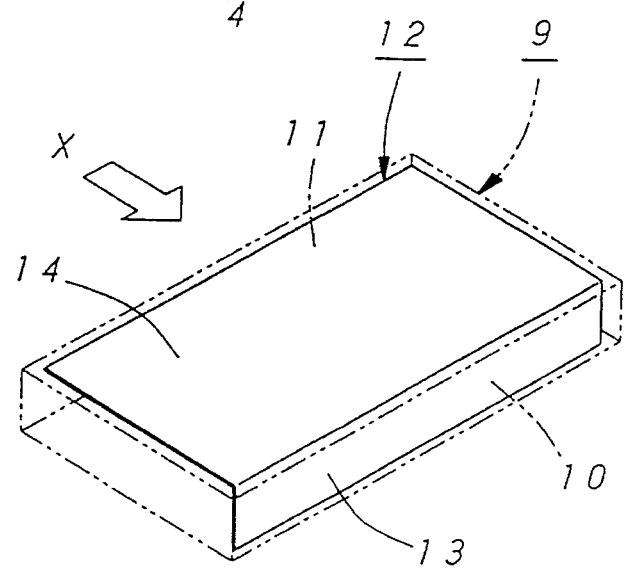
FIG. 8 is an overall perspective view of the conventional L-shaped index card.
Figure 9:
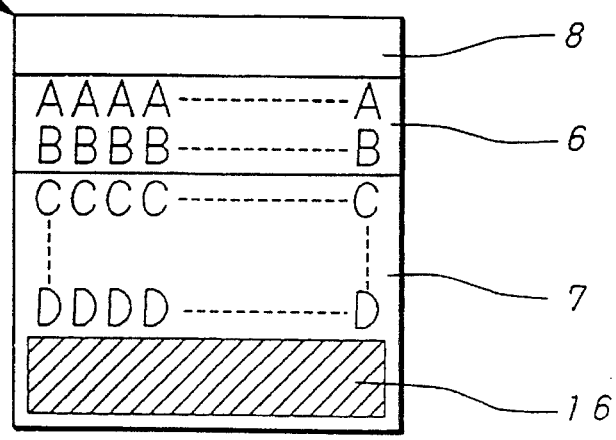
FIG. 9 is a development which explains the problem points of the conventional index card.

Here, FIG. 1 is an overall perspective view of the index card according to a first embodiment; FIG. 2 is an overall perspective view of the rear side of the index card shown in FIG. 1; FIG. 3 is a development showing the printed state of the index card shown in FIG. 1; FIG. 4 is another development showing the printed state of the index card shown in FIG. 1; FIG. 5 is a development of the index card according to a second embodiment of the present invention; and FIG. 6 is a side view showing the state where the index card shown in FIG. 5 is arranged inside a magnetic recording medium storage case.

In the first embodiment, as shown in FIG. 1, an index card 20 is used in an open-close type storage case 30 which stores a compact video tape cassette; when viewed from the side, it is seen to be folded into a U-shape.

The respective parts along a first wall 33 extending depthwise in the storage case 30, a second wall 34 extending widthwise in the storage case 30 perpendicular to this first wall 33, and a third wall 35 extending in parallel opposite this second wall 34 are folded over at a folding line 27 of the index card 20, and a double overlap is made.

Next, the unfolded state of the index card 20 is explained with reference to FIG. 3. The index card 20 has a rectangular external form, and is divided into 6 parts by border lines which are parallel to a pair of shorter sides.

As shown in FIG. 3, there are provided a first narrow part 21 along the first wall 33 of the storage case 30, a first wide part 22 along the second wall 34, and a third narrow part 25 along the third wall 35.

A second wide part 23, a second narrow part 24, and a fourth narrow part 26 are provided so as to be connected together to be contiguous with the first wide part 22. With regard to each of these parts, when folding is conducted along the folding line 27, the second wide part 23 overlaps the first wide part 22, the second narrow part 24 overlaps the first narrow part 21, and the fourth narrow part 26 overlaps the third narrow part 25.

Accordingly, when printing is conducted on the index card using a printer of a word processor or PC, since the second narrow part 24 and the fourth narrow part 26 can be supported by a paper holding mechanism and a paper feed mechanism of the printer, it is possible to conduct continuous printing over the entire paper surface from the first narrow part 21 through the first wide part 22 and second wide part 23.

After conducting folding along the folding line 27 so that the backs of the first wide part 22 and the second wide part 23 closely adhere to one another, when the index card is folded into a U-shape as shown in FIG. 1, the printed contents on the first narrow part 21 and the second wide part 22 can be read from the outside of the storage case 30.

As shown in FIG. 2, since the printed contents on the second wide part 23 can be read in a state where a cover 32 of the storage case 30 is opened, it is possible to conduct continuous printing from the front to the back side of the index card 20 of the present embodiment.

As shown in FIG. 4, it is possible to conduct full printing from the third narrow part 25 through the first narrow part 21 and the first wide part 22, and it is also possible to conduct full printing from the opposite direction from the fourth narrow part 26 through the second narrow part 24 and the second wide part 23.

Moreover, with regard to this index card 20, since printing can be made on the back as well as on the front, it is possible to print twice the amount of information compared to a conventional index card. Thus, even if the contents recorded in the magnetic recording medium are changed, it is possible to adequately respond.

In this case, by providing perforations along the folding line 27, the part which becomes unnecessary can be removed.

As explained above, according to the index card 20 of the present embodiment, since printing can be made over the entire paper surface using a printer of a word processor or PC, not only it is possible to voluminously and neatly print the contents recorded in the magnetic recording medium, but also it is possible to continuously and efficiently print from the front side through the rear side.

With regard to the index card of the second embodiment of the present invention, as may be seen from the unfolded state shown in FIG. 5, a rectangular folding part 41 has been integrally provided so as to be connected to the end (leftward in the illustration) of the third narrow part 25 of the index card 20.

As shown in FIG. 6, by folding the parts from the third narrow part 25 to the fourth narrow part 26 in the above manner into a U-shape, and by folding over the folding part 41, the fourth narrow part 26 can be clamped by the folding part 41 and the third narrow part 25.

Consequently, for example, as shown in FIG. 6, even if the tip of the fourth folding part 26 separates from the third narrow part 25 and hangs downward, when a video tape cassette 50 is stored in the cover 32 of the storage case 30, the inducive action of the folding part 41 prevents the forward part of the video tape cassette 50 from striking against the tip of the fourth folding part 26 and becoming incapable of storage.

With regard to each of the above embodiments, discussion has been made as for the index card used in the storage case housing a video tape cassette, but the present invention is not limited thereto, and can also be applied to storage cases for book-type video tape cassettes, and various storage cases for magnetic recording mediums such as audio magnetic tape cassettes, and magnetic disk cartridges.

As explained above, the index card of the present invention is configured so that the second wide part and the second narrow part are provided so as to be connected to the first narrow part and the first wide part and so that the first narrow part and the second narrow part, as well as the first wide part and the second wide part respectively overlap when folding is conducted with the border line between the first wide part and the second wide part as the folding line. Consequently, when conducting printing on the first narrow part and the first wide part using a printer of a word processor or PC, the second wide part and the second narrow part can be supported by the paper holding mechanism and paper feed mechanism of the printer.

Thus, by means of the index card of the present invention, since printing can be made over the entire paper surface of the card, not only it is possible to voluminously and neatly print the contents recorded in the magnetic recording medium, but also it is possible to continuously and efficiently print from the front side to the rear side, and it is possible to effectively utilize the paper surface of the index card.

Moreover, since the index card of the present invention is given the same form as conventional index cards by folding it over at the folding line in the central part of the card, it can be used without impediment in the storage cases of magnetic recording mediums.

Consequently, according to the present invention, it is possible to obtain an index card which permits efficient printing over its entire surface using the printer of a word processor or PC.

Furthermore, according to the present invention, since a fourth folding part is provided at one end which is able to fold over so as to wrap around the other end, when storing the tape cassette (magnetic recording medium) in the pocket of the storage case, it is possible to avoid the situation where the forward part of the tape cassette catches on the index card, and it is possible to improve the insertability of the cassette.

What is claimed is:

1. An index card which is to be mounted in a folded state inside a case for housing a magnetic recording medium and which has a rectangular form when unfolded, comprising:

a first narrow part extending along a first inner wall of the case extending depthwise;

a first wide part extending along a second inner wall of the case perpendicular to the first wall, said first wide part being connected to said first narrow part;

a second wide part connecting to an end of said first wide part at a side thereof opposite said first narrow part;

a second narrow part connecting to an end of said second wide part at a side thereof opposite said first wide part, wherein when folding is conducted with a border line at which said first wide part connects to said second wide part, said second wide part overlaps said first wide part, and said second narrow part overlaps said first narrow part, a third narrow part extending along a third wall of the case extending in parallel opposite to said second wall, said third narrow part connecting to an end of said first narrow part at a side thereof opposite said first wide part; and a fourth narrow part connecting to an end of said second narrow part at a side thereof opposite said second wide part, and said third narrow part overlapping said fourth narrow part when folding is conducted along said border line, wherein said index card defines a U-shape in the folded condition.

2. The index card of claim 1, wherein said index card has perforations disposed along and on said border line to enable said index card to be separated therealong.

3. The index card of claim 1, wherein said index card further comprises a folding flap connected to an end of said third narrow part opposite the end which is connected to said first narrow part, said folding flap being folded so as to wrap around said fourth narrow part.

4. The index card of claim 1, wherein said magnetic recording medium is received in said case between said first and second wide parts on one side thereof and said third and fourth narrow parts on the opposite side thereof.

5. An apparatus for retaining a recording medium, comprising:

a storage case including a rectangular base portion and a cover portion pivotally secured thereto; and an index card received in said base portion, said index card including:

a first narrow part extending along a first inner wall of the case extending depthwise, a first wide part extending along a second inner wall of the case perpendicular to the first wall, said first wide part being connected to said first narrow part, a second wide part connecting to an end of said first wide part at a side thereof opposite said first narrow part, a second narrow part connecting to an end of said second wide part at a side thereof opposite said first wide part, wherein when folding is conducted with a border line between said first wide part and said second wide part as a folding line, said second wide part overlaps said first wide part, and said second narrow part overlaps said first narrow part, a third narrow part extending along a third wall of the case extending in parallel opposite to said second wall, said third narrow part connecting to an end of said first narrow part at a side thereof opposite said first wide part, and a fourth narrow part connecting to an end of said second narrow part at a side thereof opposite said second wide part, and said third narrow part overlapping said fourth narrow part when folding is conducted along said folding line, wherein said index card defines a U-shape in the folded condition.

6. The apparatus of claim 5, wherein said index card has perforations disposed along said folding line to enable said index card to be divided therealong.

7. The apparatus of claim 5, wherein said index card further comprises a folding flap connected to an end of said third narrow part opposite the end which is connected to said first narrow part, said folding flap being folded so as to wrap around said fourth narrow part.

8. The apparatus of claim 5, wherein said magnetic recording medium is received in said case between said first and second wide parts on one side thereof and said third and fourth narrow parts on the opposite side thereof.

* * * * *